Patented Jan. 17, 1933

1,894,670

UNITED STATES PATENT OFFICE

FREDERICK CONLIN, OF NEW YORK, N. Y.

METHOD OF ELECTROCLEANING

No Drawing. Original application filed March 23, 1928, Serial No. 264,270. Divided and this application filed July 23, 1929. Serial No. 380,464.

This invention relates to methods of electro-cleaning and to compositions for use therein.

In my Patent No. 1,545,942, granted July 14, 1925, I have described and claimed a brush for use in electroplating. In my work making use of a brush in the electroplating and electro-cleaning of metals, I have discovered that improved results can be obtained in using the electrolyte in the form of a viscous composition, which is preferably composed of a colloidal or emulsoid solution carrying the electro-cleaning compound, to be electrolysed.

My composition is preferably prepared for commerce in a stiff condition, and is preferably made up so as to be non-caking and easily soluble in water.

In making up my composition, the electrocleaning compound is mixed with a viscous water-soluble or miscible constituent, or constituents, of which there are a large variety suitable for the purpose. The electrocleaning compound is preferably added to the viscous carrier in concentrated form, and, in the form prepared for commerce, the viscous constituent is sufficiently thick to give a composition of approximately the consistency of ordinary plastic shoe-blacking. The viscous constituent may be varied to suit the nature of the electrocleaning compound added thereto.

My composition is accordingly compact in volume, easy to pack, does not leak, and in using the same, there is a freedom from spattering or spilling, which results in less loss and inconvenience from dripping and less mess as compared with the use of the ordinary fluid solutions.

The invention further provides an improved process of electro-cleaning whereby the cleaning of surfaces may be effected more rapidly, thoroughly and neatly than heretofore.

The invention further provides a novel composition for electro-cleaning.

According to my present invention, I mix or suspend the electrocleaning compound with a suitable viscous constituent or constituents, and take some of it up in or on the applying implement carrying a suitable electrode. I prefer to use as the applying implement, a brush, dauber or the like, containing a suitable electrode, and work the composition into the brush up to and around the anode contained therein, prior to applying the brush, dauber or the like to the object to be cleaned.

The surface to be cleaned may first undergo such other preparatory processes as may be necessary or desired, and then the cleaning is effected by wiping or rubbing the surface to be plated with the applying implement carrying the composition. The electrode of the applying implement is connected in circuit before use and the object to be cleaned is also either connected in the circuit, or to a ground circuit if not already grounded, usually as cathode.

I may and preferably do use current densities at which considerable hydrogen is liberated at the cathode, or oxygen at the anode as may serve best in the cleaning or stripping operation.

I also find that with my electrocleaning composition the lading of the air with objectionable vapors such as are given off by liquid electro-cleaning baths is imperceptible, as the bubbles formed by the gases resulting from the dissociation of the electrolyte are held by the solution while under action on the surface being electro-cleaned, forming a soapy residue on the surface being cleaned.

It is convenient to use an already prepared composition in carrying on electro-cleaning according to the present invention, though the ingredients may be mixed in or on the applying implement, or otherwise, at the time of use. It is also convenient to manufacture and distribute my new composition in the form of a firm or stiff composition, about of the consistency of ordinary plastic shoe blacking. This does not leak and is readily packed and shipped in slip cover containers. This also provides for the retention of a homogeneous distribution of the ingredients in the mixture, after mixing and standing, and is also a convenient form for use with an applying implement. Moreover, the result is assured that there is always a uniformity of the electrolyte, as the applying implement receives a full supply of a uniform electrolyte each time that it is replenished from the container. In the use of my composition in its preferred form, the brush or the like is first dipped in water and afterward rubbed over the surface of the composition of stiff consistency, the water dissolving or diluting the composition and the bristles working the composition to a creamy or paint-like consistency, which can be used without dripping the viscous character of the solution making the solution in the interstices more resistant to expulsion by pressure upon the brush such as is used in applying the brush to an article to be cleaned. Paucity of the solution in the interstices of the brush or implement, with consequent increase of resistance and heating within the implement is avoided. Moreover, the character of the solution enables the electro-cleaning to be carried out overhead, and otherwise, with substantially the same facility and neatness as the application of a coat of paint to a surface with a paint brush.

In the case of prepared compositions, it is desirable to prevent it hardening on standing. In many cases it will be desirable to add a non-drying or moderately hydroscopic substance, to prevent hardening and for this purpose I may use any suitable substance. I prefer to use a sugar or sugar solution or honey, and more particularly cane-sugar or other syrup.

I may also make use of jellies, such as obtained from fruits, and containing sugars, and obtain at once a sugar-containing colloid as the viscous constituent.

The viscous constituent is preferably a colloid or emulsoid having adhesive properties. Gelatines of animal or vegetable origin, such as obtained from animal tissues, hides, etc. and from sea-weed such as Irish moss, are examples.

In forming my composition, using gelatine as the colloid, I dissolve the gelatine in about double its weight of water and add an amount of the hygroscopic substance which will prevent hardening on shelf-standing. The amount of hygroscopic substance is variable, depending on the substance and the amount of water already contained therein. In the case of cane syrup added to gelatine solution, I preferably use an amount equal to or somewhat more than is equal to the weight of the gelatine solution.

To this mixture I then add the electro-cleaning compound (conveniently one of the prepared mixtures sold by chemical and electroplating supply houses), until the composition stiffens up to the desired consistency, the preferred consistency, as stated above, being firm or stiff, about that of ordinary plastic shoe-blacking.

In carrying out electrolytic cleaning, I preferably use an acid or salt solution (as for example acetic acid or an ammonium salt) with the applying implement, for example a brush, and preferably use this acid or salt in admixture with a viscous constituent, preferably a colloidal solution, such for example as a gelatine solution, and preferably also with an ingredient to prevent hardening on standing.

A particular example of composition is as follows:

Gelatine ---------------- 2 ounces (weight)
Cane syrup ------------- 9 ounces (weight)
Water ------------------ 4 ounces (weight)
Cleaning acids or salts __ Enough to give a stiff consistency.

A mode of procedure in carrying out electro-cleaning with said composition, is to dip a brush, dauber or other applying implement (such for example as that shown in my Patent No. 1,545,942) into water and then into the stiff composition. The applying implement is worked around over the surface of the composition, which is preferably taken up as a creamy consistency, either by having the composition at such consistency or reducing it to such consistency with water.

The applying implement is connected in circuit and wiped or rubbed over the surface to be cleaned, the current releasing hydrogen on the metal surface, (or oxygen, as heretofore explained) and the combined action of hydrogen bubbles and mechanical action of the applying implement, effect cleaning much more rapidly and thoroughly than is carried out in a bath. Either direct or alternating current may be used in the cleaning process or method. Using the above electro-cleaning composition, a potential difference of 15 volts more or less between the electrodes and a current density of 2 amperes more or less per square inch gives good results.

Moreover, I may also add a compound having a chemical cleaning action, as for example, an ammonium salt, and thereby obtain a combined mechanical, electro-chemical and chemical cleaning action.

By using a composition comprising a viscous constituent as the carrier of the acid (or other compound) cleaning may be readily carried out neatly on articles in situ, dropping of corrosive liquid being avoided by exercising reasonable care. Dispersion of corrosive vapors to the atmosphere is also much diminished.

This application is a division of my application Serial No. 264,270, filed March 23, 1928.

Various other forms of the composition than the specific composition set forth herein may be used, without departing from the idea of invention, and the process may also be practiced in other forms than that herein specifically set forth.

What is claimed is:

1. A method of electrocleaning by means of an applying implement in the form of a brush in which the solution is held in interstices between flexible bristles or filaments and through which current is passed from an electrode in the brush, comprising loading the brush with a viscous electrocleaning solution containing a soluble electrolyte of the electro-cleaner type which releases gas at the surface to be cleaned, and an amount of viscous constituent to render the solution resistant to expulsion from the said interstices when pressure is applied to the solution-laden brush in the act of applying the same, and passing current from the said electrode in the brush to a surface to be cleaned while said solution-laden brush is rubbed thereon.

2. A method of electrocleaning by means of an applying implement in the form of a brush in which the solution is held in interstices between flexible bristles or filaments and through which current is passed from an electrode in the brush, comprising loading the brush with a viscous electrocleaning solution containing a soluble electrolyte of the electro-cleaner type which releases gas at the surface to be cleaned, and an amount of colloidal constituent to render the solution resistant to expulsion from the said interstices when pressure is applied to the solution-laden brush in the act of applying the same, and passing current from the said electrode in the brush to a surface to be cleaned while said solution-laden brush is rubbed thereon.

3. A method of electrocleaning by means of an applying implement in the form of a brush in which the solution is held in interstices between flexible bristles or filaments and through which current is passed from an electrode in the brush, comprising loading the brush with a viscous electrocleaning solution containing a soluble electrolyte of the electro-cleaner type which releases gas at the surface to be cleaned, and an amount of gelatine to render the solution resistant to expulsion from the said interstices when pressure is applied to the solution-laden brush in the act of applying the same, and passing current from the said electrode in the brush to a surface to be cleaned while said solution-laden brush is rubbed thereon.

In witness whereof, I have hereunto signed my name.

FREDERICK CONLIN.